(12) United States Patent
Spata

(10) Patent No.: US 8,671,409 B2
(45) Date of Patent: Mar. 11, 2014

(54) SCHEDULING METHOD AND SYSTEM, CORRESPONDING COMPUTATIONAL GRID AND COMPUTER PROGRAM PRODUCT

(75) Inventor: Massimo Orazio Spata, Catania (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 1317 days.

(21) Appl. No.: 12/101,740

(22) Filed: Apr. 11, 2008

(65) Prior Publication Data

US 2008/0263557 A1 Oct. 23, 2008

(30) Foreign Application Priority Data

Apr. 13, 2007 (IT) ............................. TO2007A0258

(51) Int. Cl.
*G06F 9/46* (2006.01)
(52) U.S. Cl.
USPC ........................................................ 718/102
(58) Field of Classification Search
None
See application file for complete search history.

(56) References Cited

U.S. PATENT DOCUMENTS

| 6,055,571 A * | 4/2000 | Fulp et al. ................ 709/224 |
| 2004/0111527 A1* | 6/2004 | Czap et al. ................ 709/235 |
| 2007/0094002 A1* | 4/2007 | Berstis et al. ................ 703/22 |

OTHER PUBLICATIONS

Chun-Tian Cheng (parallel algorithm for grid resource allocation based on Nash Equilibrium, Aug. 2006, IEEE).*
Massimo Orazio Spata (Agent-based negotiation techniques for a gird, Dec. 2006, IEEE).*

* cited by examiner

*Primary Examiner* — Emerson Puente
*Assistant Examiner* — Sisley Kim
(74) *Attorney, Agent, or Firm* — Allen, Dyer, Doppelt, Milbrath & Gilchrist, P.A.

(57) ABSTRACT

A scheduler device schedules executions of jobs using resources of a computational grid. The scheduler is configured for identifying an equilibrium threshold between resources and jobs. Below the equilibrium threshold, the scheduler schedules the execution of the jobs using the resources of the computational grid according to Pareto-optimal strategies. Above the equilibrium threshold, the scheduler schedules the execution of the jobs using the resources of the computational grid according to Nash-equilibrium strategies.

32 Claims, 4 Drawing Sheets

SCHEDULING METHOD AND SYSTEM, CORRESPONDING COMPUTATIONAL GRID AND COMPUTER PROGRAM PRODUCT

FIELD OF THE INVENTION

The present invention relates to techniques of selective allocation (scheduling) of resources and has been developed with particular attention paid to its possible use in the field of computational grids, for example for simulation purposes

BACKGROUND OF THE INVENTION

Computer simulation has become an important tool for studying and interpreting various physical processes. This technique presents, however, considerable limits in relation to its aims and to the accuracy of the results, owing to the stringent requirements in terms of computational power that are difficult to meet even using the most advanced supercomputers. Simulating a very complex model calls for supplementary computing power as the number of parameters of the model increases.

One way to address this problem is to supply the computing power used by exploiting a network of computers (servers) connected to one another. From the user's standpoint, this approach is desired to be transparent. It is desirable, in fact, that the network should appear as a single large virtual supercomputer. This new computational paradigm is called "grid." Providing an integrated computing-grid environment may make it possible to give rise to computing infrastructures with incomparable potential.

From the conceptual standpoint, a grid is simply a set of computational resources that perform tasks or jobs assigned to it. It appears to the users as a single large system that offers a single access point with distributed and powerful resources. The users treat the grid as a single computational resource. The grid accepts the tasks assigned by the users and allocates them selectively (i.e., "schedules" them) in view of their execution on suitable systems comprised in the grid on the basis of resource-management policies. The users can thus entrust to the grid tasks that are even rather burdensome (for example, many activities to be carried out in a short time), without having to be concerned as to where the tasks will materially be carried out.

The main advantages linked to the use of a computational grid (the so-called "Grid Computing") are reduction of hardware costs, balancing of the job load between the various "machines" (via a load management system), capacity for managing heterogeneous systems, increase in productivity, and lower exposure to hardware obsolescence.

In actual fact, however, it is difficult to define a system approach to the management of the grid resources to be really transparent for the users. This is chiefly due to the heterogeneous architectural characteristics of the grid.

In this connection, one may think that the users of the grid may implement a manual approach to allocating the resources of the grid (carried out via job-description tools, i.e., using JDL (Job Description Language) script. This approach puts the choice and estimation of the resources used at the disposal of the user of the grid, and this inevitably implies a risk of overestimation or underestimation of the resources due to human error, with consequent waste of the resources of the grid (see in this connection the article by Spata, et al. entitled, "Agent-based negotiation techniques for a Grid: the Prophet Agents", $2^{nd}$ IEEE International Conference on e-Science and Grid Computing 2006.

There have on the other hand already been experiments in the computer-program sector of the application of principles and criteria drawn from the world of economy (see, for example, the article by D. Ferguson, et al. entitled, "Economic models for allocating resources in computer systems", in Scott Learwater, Editor, "Market-Based Control: A Paradigm for Distributed Resource Allocation", World Scientific, Hong Kong, 1996 and the article by Y. K. Kwok, et al. entitled, "Non-Cooperative Grids: Game Theoretic Modeling and Strategy Optimization", submitted to IEEE Trans. Parallel and Distributed Systems, December 2004).

In the article by D. Ferguson, et al. entitled, "Economic models for allocating resources in computer systems", it is shown that, by applying a scheduling algorithm based upon the so-called Nash equilibrium as economic model for distributed systems, the average queuing time decreases when the use of the system resources increases. On the other hand, it has been shown that, using the optimal algorithm, if the use of the resources increases, the average queuing time increases also. In fact, starting from a queue with zero load, with homogeneous jobs belonging to the same class, it emerges that the scheduling procedure based upon Nash equilibrium is advantageous only if the utilization factor per queue (understood as container of homogeneous computational servers) is higher than an agreed threshold time. In fact, when the queue has emptied and the jobs have an average duration shorter, for example, than one hour, the scheduling algorithms based upon balancing of the load operate already very well. The problem starts to arise when the jobs last on average more than one hour, loading heavily the CPU (jobs of a CPU-bound type).

In the article by Y. K. Kwok, et al. entitled, "Non-Cooperative Grids: Game Theoretic Modeling and Strategy Optimization", three different scheduling procedures are compared: Nash equilibrium, random, and MinMin (optimal). Here, the results show that the approaches based upon game theory and on Nash equilibrium are very similar to a random-planning strategy, while the Pareto-optimal algorithm (MinMin) proves to be the best scheduling algorithm. In this document, no information is given on the system-utilization factor, ρ. In fact, the main problem of scheduling procedures based upon optimal strategies (i.e., MinMin) lies in that they can be applied advantageously only when the value of this factor remains lower than a given threshold x.

SUMMARY OF THE INVENTION

The foregoing analysis shows that there is a need for scheduling techniques (and hence for schedulers) capable of operating in an altogether automatic way and in conditions of transparency for users. In particular, there is a need to have available approaches that may take into account the fact that the grid architecture resembles a distributed architecture. It is desired that the grid should present the following characteristics; heterogeneity in terms of operating system, clock rate, representation of the data, memory, hardware architectures, and openness to guarantee scalability and re-implementation of platforms. Moreover, it is desired that the grid present security to guarantee confidentiality and integrity of the data, scalability, understood as the capacity to guarantee adequate performance even though the number of users and resources increases in time, and resistance to faults (fault tolerance), in particular with regard to the capacity for masking and tolerating momentary breakdown. Finally, the grid should present synchronization, i.e., the capacity to order the events completely, with mutual exclusion, integrity of the operations, and competitive control of the deadlock points, and transparency, with the possibility of guaranteeing access to local and remote resources with the same procedures, without appreciable losses in terms of performance and without having any need to know the state of the resources.

In these systems, the notion of time may be vital for giving a precise order to the events that derive from parallelizable processes. An object of the present invention is to provide an approach that may have the characteristics outlined above. According to an embodiment, that object may be achieved thanks to a method having the characteristics described above. Other embodiments relate to a corresponding system and a computational grid that comprises the system, as well as to a computer program product, loadable in the memory of at least one computer and including software code portions for implementing the method when the product is run on at least one computer. As used herein, the reference to such a computer program product is intended to be similar to a computer-readable medium containing instructions for control of the processing system for coordinating implementation of the method according to the embodiment. The reference to at least one computer is of course intended to highlight the possibility that the present embodiment is implemented in modular and/or distributed form.

In particular, the approach described herein is based upon the use of a microeconomy paradigm for managing the grid resources. There exists, in fact, a metaphorical relation between a grid and a microeconomic model, in which one of the most important aims is to analyze the market mechanisms that establish the relative prices between goods and services and the allocation of limited resources among a large number of alternative uses. Typical sectors of study in microeconomy are game theory and Nash equilibrium.

In a preferred embodiment, the approach described herein is founded precisely upon a system of grid adaptation of an intelligent type (Intelligent Grid Matchmaking System), which implements a scheduling procedure based upon game theory and upon Nash equilibrium applied to distributed systems, like a computational grid.

A possible embodiment of the approach described herein involves the use of an automatic grid middleware that synchronizes the actions of booking the computational resources so as to automate concurrent access to shared resources. This process of automation can be obtained via procedures that ensure a job-completion time and schedule execution of the jobs in a grid.

By way of summary, since a computational grid is a distributed architecture, where heterogeneity is a standard attribute, both on the one hand simulators (software and applications) and on the other hand hardware, the approach described herein enables automation of the process of submitting jobs at the user end, freeing the user himself from choices and estimation regarding the duration of the job to be submitted, the type of hardware compatible for the application (for example a 32-bit application may not be executed on a 64-bit computation server), and to the amount of resource allocated (in terms of CPU and RAM time). The user, in fact, is often not able to estimate these parameters correctly. In addition to this, this request for inference at the user end implies a lack of transparency, which, as has been seen, provides instead a preferential characteristic that, it is expected, should be present in a distributed system, such as a computational grid.

In a preferred embodiment, the approach described herein pursues the aim of masking the hardware and software entropy implicit in a grid through the classification of the jobs and resources in homogeneous classes via a technique based upon the use of Prophet Agents (see the article by Spata, et al. entitled, "Agent-based negotiation techniques for a Grid: the Prophet Agents", 2nd IEEE International Conference on e-Science and Grid Computing 2006), and the creation of a system of adaptation ("matchmaking") between a specific class of job and a specific class of resources and scheduling of the job in the queue, maximizing the throughput (High Throughput Computing—HTC) with the use of Prisoner Agents.

BRIEF DESCRIPTION OF THE DRAWINGS

The invention will now be described, purely by way of non-limiting examples, with reference to the annexed figures, in which.

DETAILED DESCRIPTION OF THE PREFERRED EMBODIMENTS

Figure 1:
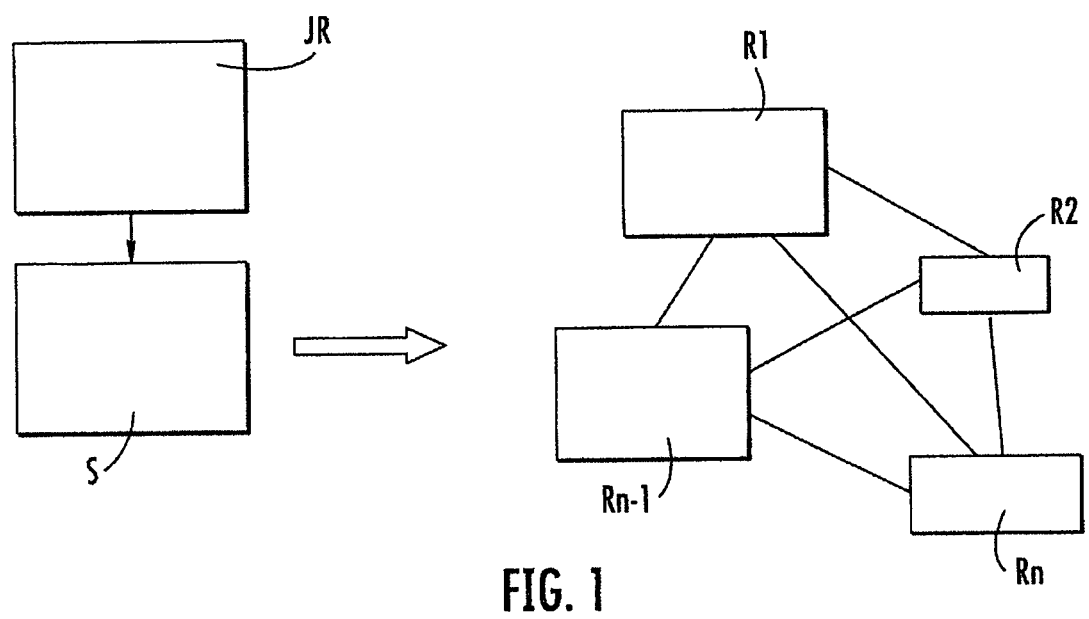
FIG. 1 illustrates, in the form of a block diagram, a typical context of application of the present invention.

In FIG. 1, the references $R_1, R_2, \ldots R_{n-1}, R_n$ represent, as a whole, homogeneous computational resources (job nodes or Worker Nodes WN) belonging to the same queue of a known type, connected to one another, also here according to criteria in themselves known, so as to form a computational grid.

A scheduler module S receives from the users of the grid requests for carrying out "jobs" JR. These requests may typically be likened to requests for execution of computational jobs, such as computational jobs that correspond to the simulation of a complex system.

As represented more clearly in the functional diagram of FIG. 2, the jobs JR are supplied to a module JC, which functions as classifier and co-operates on the one hand, with the applications A that are to be run on the system (in the sequel of the present description constant implicit reference will be made to a computational grid, even though the reference must not be interpreted as in any way limiting the scope of the invention), and, on the other hand, with a Load-Balancing module LB, which in turn interacts with an HRC module that carries out classification/assignment of the hardware resources of the system in respective queues.

The HRC module interfaces with the hardware resources proper (CPU and RAM resources, for example), designated as a whole by HR, via a function AA of architectural analysis and of administration of the system, i.e., of the grid.

In the absence of more specific indications given in what follows, the modules/functions just described are to be considered as a whole known in the art and hence such as not to require any further detailed description herein.

Figure 2:
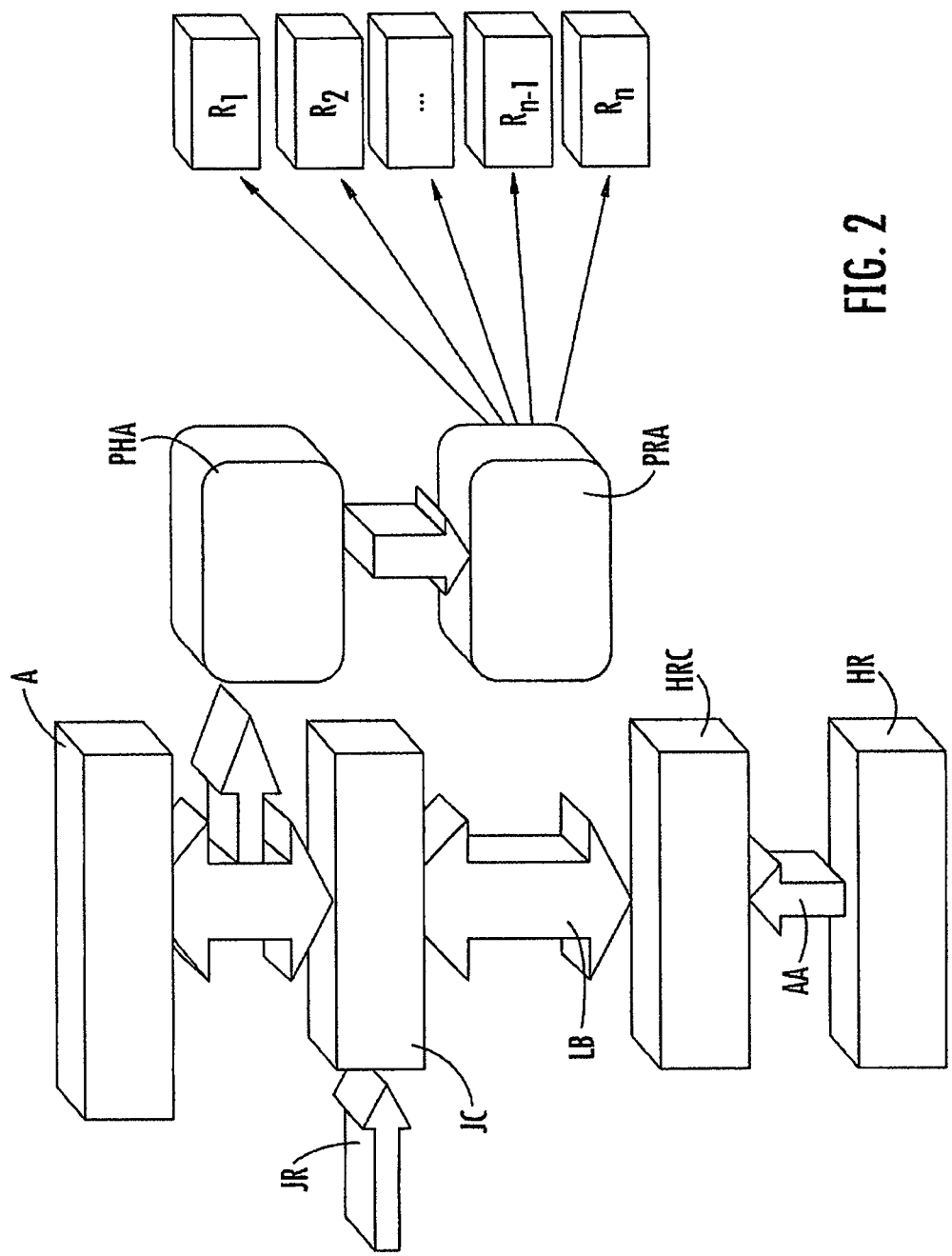
FIG. 2 is a diagram representing the functional organization of the present invention.

The diagram of FIG. 2 highlights the presence, in the field of the scheduler S, of two classes of agents (the term "agent" is used herein with the meaning that it normally has in the world of networks and computer systems), namely Prophet Agents PHA, of the type described in the article by Spata, et al. entitled, "Agent-based negotiation techniques for a Grid: the Prophet Agents" and Prisoner Agents PRA, which interact with the homogeneous server queues R1, R2, . . . , Rn−1, Rn and are able to know the (average) time of completion of the jobs using the grid thanks to information supplied, in a known way, by the prophet agents PHA.

In general, in a game, Pareto-optimal strategies are applied when the allocation of resources is unable to improve the condition of a player without worsening the condition of another player. In the context of interest herein, these strategies function until a threshold equilibrium is exceeded between the resources (CPU and RAM resources, for example) and jobs, contrary to what applies for Nash-equilibrium strategies. Consequently, a threshold is identified experimentally, below which Pareto-optimal strategies are applied and above which Nash-equilibrium strategies are applied.

To explain in detail what is meant exactly by "Nash equilibrium" it may be useful to clarify some simple mathematical aspects of game theory and define some basic concepts.

A game is characterized by a set G of players, or agents, that can be designated by $i=1, \ldots, N$, and a set S of strategies, including a set of N vectors $S_i=(s_{i,1}, s_{i,2}, \ldots, s_{i,j}, \ldots, s_{i,M_i})$, each of which contains the set of the strategies that the i-th player has at his disposal, i.e., the set of the actions that he can perform. (for reasons of brevity, designated in what follows by $s_i$ is the strategy chosen by the i-th player.) Moreover, there is a set U of functions of the type $u_i=U_i(s_1, s_2, \ldots, s_N)$, which associate to each player the gain or payoff $u_i$ deriving from a given combination of strategies (the payoff of a player in general depends in fact not only upon his strategy but also upon the strategies chosen by his adversaries).

A Nash equilibrium for a given game is a combination of strategies (indicated by the superscript *) $s_1^*, s_2^*, \ldots, s_N^*$ such that $U_i(s_1^*, s_2^*, \ldots, s_i^*, \ldots, s_N^*) \geq U_i(s_1^*, s_2^*, \ldots, s_i, \ldots, s_N^*)$ for each i and for each strategy $s_i$ chosen by the i-th player.

The meaning of the latter inequality is very simple. If a game admits of at least one Nash equilibrium, each agent has available at least one strategy that he has no interest in abandoning if all the other players have played their own strategy $s^*_i$. In fact, as may be inferred directly from the inequality, if the player i plays any strategy available to him different from $s^*_i$, while all the others have played their own strategy $s^*_j$, he can only worsen his own payoff or, at the most, leave it unchanged.

It may be inferred then that if the players reach a Nash equilibrium, no one can any longer improve his own result by modifying only his own strategy, and is thus bound by the choices of the others. Since this applies to all the players, it is evident that if a Nash equilibrium exists and this is unique, it represents an approach to the game in so far as none of the players have any interest in changing strategy.

A Nash equilibrium thus defined [5, 6] can be viewed as a record of the equilibrium strategies s* including the optimal responses of all the agents, obtained through the intersection of sets of optimal strategies for each agent.

The ensuing discussion will regard the agent payoff model, u (x). We shall assume that M* is a set of jobs belonging to the same class, denoted by $j_1, j_2, \ldots, j_m$, where $J=\{j_1, j_2, \ldots, j_m\}$ is the set of alternatives available. The components of these classes J have a number of common attributes that can be classified, according to the criteria set forth in [1, 7], as functional and non-functional attributes (NF).

Given N attributes NF $X_1, X_2, \ldots, X_N$, $a_{mn}$ is a value of attribute $X_n$ of a component $j_m$, where $m=1, 2, \ldots, M$ and $n=1, 2, \ldots, N$. Hence, according to the Von Neumann and Morgenstern method, we have $$a_n^{(0)} = \min_{1 \leq m \leq M^*} \{a_{mn}\} \quad a_n^* = \max_{1 \leq m \leq M^*} \{a_{mn}\}$$

$RX_n=[a_n^{(0)}, a_n^*]$ is then the field of values that an attribute $X_n$ can assume from among all the alternatives available. For each attribute NF $X_n$ a utility function $u_n: RX_n \to [0,1]$ is constructed.

Given $x_n \in RX_n$, $u_n(x_n)$ represents the utility function obtained when a component receives a number of attribute $x_n$ of $X_n$. For the next event, $u_n$ is indicated simply by u, eliminating the subscript n.

For the attribute X let $x^{(W)}, x^{(B)} \in RX$ be, respectively, the worst and the best from among all the possible values. It is assumed that the best (worst) choice is one of high (low) value and that $$x^{(W)}, x^{(B)} \in \{a^{(0)}, a^*\} \text{ so that } u(x^{(B)})=0 \text{ and } u(x^W)=1.$$

The payoff function is given (see the article by S. Merad, et al. entitled, "Dynamic Selection of Software Components in the Face of Changing Requirements", Department of Computing Science, University of Newcastle-upon-Tyne, U.K., Technical Report No. 664, 1999) by $$u(x) = \frac{x - x^{(W)}}{x^{(B)} - x^{(W)}}$$

This formula expresses the agent payoff matrix M'. To identify the scheduling/planning algorithm, the procedure may be as described in what follows.

Given m prisoner agents $g_1, g_2, \ldots, g_m$ and given m jobs $j_1, j_2, \ldots, j_m$ assigned to the grid, assuming that $WN_1, WN_2, \ldots, WN_c$ are c job nodes (Worker Nodes) inherent in the same calculation server classes, and assuming that the number of jobs is larger than the number of WN, it is helpful to co-allocate more jobs on the same node WN. The players-agents of a prisoner type (Prisoner Agents PRA) may choose which jobs are to be allocated on a server according to an approach to the Prisoner's Dilemma offered by Nash equilibrium and considering the possible strategies that can be adopted for maximizing his own profit on the basis of guesses (conjectures) of the agents.

A model is then formulated in terms of: players=agents=jobs, $j_1, j_2, \ldots, j_m$ available move, choice of $WN_1$, choice of $WN_2, \ldots$, choice of $WN_c$, profit, maximization of the likelihood of optimizing the probability of the job-completion time for an agent $j_i$, and payoff matrix $M'=\{M'_1, M'_2, \ldots, M'_p\}$.

The Table 1 reproduced below illustrates the notation in the formulation according to game theory.

TABLE 1

| Symbol | Definition |
| --- | --- |
| T | Time of completion estimated for the j-th job |
| $WN_j$ | Node of j-th job |
| μ | Service time of a node WN for a specific class of jobs |
| C | Number of WN belonging to a queue |
| J | Homogeneous class of jobs $[j_1, \ldots, j_m]$ |
| S* | Nash-equilibrium vector strategy |
| M* | Set of jobs belonging to same class |
| N | Number of attributes NF belonging to same class |

TABLE 1-continued

| Symbol | Definition |
| --- | --- |
| $X_N$ | Class of attributes NF |
| $a_{mn}$ | Value of attribute of Xn for the component $j_m$, with m = 1, ..., M * and n = 1, ..., N |
| u(x) | Utility function for a class of attributes NF |
| $X^{(W)}n$ | Worst value of the class $X_n$ of attributes NF |
| $X^{(B)}n$ | Best value of the class $X_n$ of attributes NF |
| $RX_n$ | Field of values for the class $X_n$ of attributes NF |
| $g_i$ | i-th agent-player with i = 1, ..., m |
| P | Number of payoff matrix |
| N | Number of attributes NF X |
| M | Number of jobs-agents |
| M' | Payoff matrix of the Prisoner Dilemma |

In order to apply this model to a specific example, we shall assume having three agents for three jobs that are to be scheduled on two WN. The possible moves are equivalent to all the possible allocations of jobs $j_1, j_2, \ldots, j_m$ on the nodes $WN_1, WN_2, \ldots, WN_c$. The total number of available moves for each agent is given by the number of WN that can be selected raised to the number of the jobs-agents $c^m$.

In the model here proposed, the payoff is optimization of the probability of job completion time (see the article by Spata, et al. entitled, "Agent-based negotiation techniques for a Grid: the Prophet Agents"-2$^{nd}$ IEEE International Conference on e-Science and Grid Computing 2006). The payoff matrix $M'=\{M'_i\}$ with i=1, ..., p includes a matrix number equal to p and a number of rows and columns equal to the number c of the nodes WN. The matrix rows are records referring to the number of agents/jobs.

$$\text{Thus } p = \begin{cases} 2*(m-2) & \text{if } (m > 2) \\ 1 & \text{if } (m = 2) \end{cases}$$

In the example here considered, the payoff matrix for the Prisoner's Dilemma can be represented as a matrix of dimensions c*c*p. On the hypothesis that each agent finds a job, the payoff is represented with records of the type: (x, y, z) (see the article by Osborne, et al. entitled, "A Course in Game Theory"—the MIT Press (Jul. 12, 1994), p. 9 paragraph "Strategic Games").

To construct the payoff matrix, a matrix of attributes is constructed for each job. The matrix includes $(X_1)$, the estimated service time of a job $(\mu_{WNj})$, $(X_2)$, the length of the queue $(L_q)$, and $(X_3)$, the estimated interarrival rate of the jobs $(\lambda_{WNj})$.

Hence, following the model described in the article by S. Merad, et al., entitled, "Dynamic Selection of Software Components in the Face of Changing Requirements", Department of Computing Science, University of Newcastle-upon-Tyne, U.K., Technical Report No. 664, 1999, the attribute columns are $(X_1, X_2, X_3)$ and are represented by the following matrix:

| Jobs | Attributes | | |
| --- | --- | --- | --- |
| | μ | $L_q$ | Λ |
| $j_1$ | $a_{11}$ | $a_{12}$ | $a_{13}$ |
| $j_2$ | $a_{21}$ | $a_{22}$ | $a_{23}$ |
| ... | ... | ... | ... |
| $j_m$ | $a_{m1}$ | $a_{m2}$ | $a_{mn}$ |

The value of three attribute components NF with respect to n jobs $j_1, j_2, \ldots, j_n$ is calculated for each vector of attributes NF $X_1, X_2, X_3$ and for each possible choice of nodes ($WN_1$, $WN_2$).

Then, $u(x)_{mn}$ is calculated on $WN_1$ if $x_1=\mu$, $x_2=Lq$, $x_3=\lambda$, and then on $WN_2$ $$u(x_1)_{11} = \frac{x_1 - x_1^{(W)}}{x_1^{(B)} - x_1^{(W)}}$$

$$u(x_2)_{12} = \frac{x_2 - x_2^{(W)}}{x_2^{(B)} - x_2^{(W)}}$$

$$u(x_3)_{13} = \frac{x_3 - x_3^{(W)}}{x_3^{(B)} - x_3^{(W)}}$$

Calculated in a similar way are $u(x_1)_{21}$, $u(x_2)_{22}$ and $u(X_3)_{23}$ for $WN_2$, and so forth up to $WN_c$. In this way, there are three utility "weights" per job on each WN. These three components represent weights associated to respective attributes; the average value offers a (weighted) utility function unique for each job.

Substituting the values $x_1$, $x_2$ and $x_3$ in the function u(x) for $WN_1$, we have, and likewise for $WN_2, \ldots, WN_c$, $$\left.\begin{array}{l} g_1(u(x_1)_{11}, u(x_2)_{12}, u(x_3)_{13}) \\ g_2(u(x_1)_{21}, u(x_2)_{22}, u(x_3)_{23}) \\ \ldots \\ g_m(u(x_1)_{m1}, u(x_2)_{m2}, u(x_3)_{m3}) \end{array}\right\} u(x)_{WN_1} \Rightarrow \begin{cases} u(x)_{WN_1 j_1} \\ u(x)_{WN_1 j_2} \\ \ldots \\ u(x)_{WN_1 j_m} \end{cases}$$

Then, the Prisoner's Dilemma of game theory, applied to the model, yields the matrix p $M'=\{M'_1, M'_2, \ldots, M'_p\}$, where the vector values have been calculated via u(x). In other words, each prisoner agent G makes guesses (conjectures) on the other agent strategies and makes the best choice (with higher profit value) for him, making sure that each other agent may not have another strategies with higher profit u(x), moving over the entire matrix and following Nash-equilibrium approaches for the Prisoner's Dilemma problem.

Then, for example, given three jobs and two nodes WN, the matrix of the Prisoner's Dilemma M' is $M'_1$:

| | $j_3$ chooses $WN_1$ | |
| --- | --- | --- |
| | $j_2$ | |
| $j_1$ | $WN_1$ | $WN_2$ |
| $WN_1$ | (u(x)$_{WN1j1}$, u(x)$_{WN1j2}$, u(x)$_{WN1j3}$) | (u(x)$_{WN1j1}$, u(x)$_{WN2j2}$, u(x)$_{WN1j3}$) |
| $WN_2$ | (u(x)$_{WN2j1}$, u(x)$_{WN1j2}$, u(x)$_{WN1j3}$) | (u(x)$_{WN2j1}$, u(x)$_{WN2j2}$, u(x)$_{WN1j3}$) |

M'2:

|  |  | $j_3$ chooses $WN_2$ | |
|---|---|---|---|
|  |  | $i_2$ | |
| $j_1$ |  | $WN_1$ | $WN_2$ |
|  | $WN_1$ | $(u(x)_{WN_1j_1},$ $u(x)_{WN_1j_2},$ $u(x)_{WN_2j_3})$ | $(u(x)_{WN_1j_1},$ $u(x)_{WN_2j_2},$ $u(x)_{WN_2j_3})$ |
|  | $WN2$ | $(u(x)_{WN_2j_1},$ $u(x)_{WN_1j_2},$ $u(x)_{WN_2j_3})$ | $(u(x)_{WN_2j_1},$ $u(x)_{WN_2j_2},$ $u(x)_{WN_2j_3})$ | where M'1 is the input matrix number 1, and $u(x)_{WN_{ij_i}}$ is the weighting function obtained from individual attribute components for the i-th job on the j-th node WN.

Nash equilibrium is calculated on the payoff matrix in the following way. There is a fixed payoff for the agents $g_1$ and $g_3$, and then the second agent $g_2$ moves on the row (axis x of the matrix) to verify whether there exists a better strategy (in terms of payoff u(x), first component). There is a fixed payoff for the agents $g_2$ and $g_3$, and then the first agent $g_1$ moves on the columns (axis y of the matrix) to verify whether there exists a better strategy (in terms of payoff u(x), second component). There is a fixed payoff for the agents $g_1$ and $g_2$, and then the third agent $g_3$ moves on the axis z of the matrix to verify whether there exists a better strategy (in terms of payoff u(x), third component) (see the article by Osborne, et al. entitled, "A Course in Game Theory"—The MIT Press (Jul. 12, 1994), p. 9, paragraph "Strategic Games").

In what follows, there will be described in even greater detail, also with reference to FIGS. 3 and 4, a possible embodiment of an agents system that aims at providing, on a computational grid, an infrastructure that is able to analyze the set of the jobs executed on the grid in order to obtain a scheduling algorithm, for example of an HTC (High-Throughput Computing) type.

In such a possible embodiment, the main entities forming part of the system are a database (jobInfo) that represents and identifies the jobs to be done, AgentNash (or Nash agent NA), AgentProphet (or prophet agent PHA), AgentInterpreter (or interpreter agent IA), and FindNashEquil (the Nash-equilibrium search function).

The data base jobInfo has an initial structure that enables classification of each job in a series of subclasses, for example with recourse to a table of the type:

| jobs_subclass | V |
|---|---|
| ¶ ID: INTEGER(10) | |
| ◊ fet_name: VARCHAR(30) | |
| ◊ subclass: INTEGER(10) | |
| ◊ value_netlist: DOUBLE | |
| ◊ lambda: DOUBLE | | where fet_name identifies the type of job, subclass is an integer specifying the subclass of the job in question, value_netlist is a classification parameter, greater details of which are provided hereinafter, and lambda is the average interarrival time of the jobs JR.

The Nash agent NA is the main agent of the system. There exists a single instance, which analyzes, for example, 6 jobs a time to be scheduled on, for example, 4 worker nodes. Its behavior is defined by the class NashBehavior. The Target is to create a file (called: 'matrix.txt') containing the payoff matrices for the last 6 jobs. After having defined the matrix on file, Nash equilibrium is sought.

The computational steps envision that, in the first place, the Nash agent instantiates an object Listener L, which knows the information on the jobs JR entered in the grid, and then takes cyclically, via the Listener L, the last 6 jobs submitted on the grid, and the corresponding information.

The Nash agent represents then for each job a prophet agent PHA, for receiving, via this, from the prisoner agent PRA, nu*netlistComplexity and lambda. Starting from the 6 pairs of nu* netlistComplexity, and lambda, the Nash agent constructs the matrix of the NF-attributes and calculates the utility function on each worker node starting from the NF-attributes. It then calculates the function U, starting from the utility function, and writes the matrix obtained from analysis of the 6 jobs on the 4 worker nodes, exploiting the Prisoner's Dilemma.

In greater detail, the Listener agent L may be defined as follows:

| Listener |
|---|
| – directoryFile: String = "C:\\Docum... |
| – listener: Listener = newListener( ) |
| – ID: long |
| – Listener( ) |
| + getIstance( ): Listener |
| + getLastSixJob( ): Vector |
| – parsing(numberJobsFinds: int): void |

The class is formed on the basis of a design pattern of a singleton type, the purpose of which is to enable creation of just one instance, the latter being referenced by the Nash agent NA. This class is introduced into the agents system for retrieval of the information on the set of the jobs executed on the grid, in particular for enabling the caller, i.e., the Nash agent NA to retrieve the information discussed. For this purpose, there is envisioned within the class a private variable that points at the log file that contains the information on the job.

Cyclically, from the Nash agent NA an attempt is made to retrieve the last jobs (for example, the last 6 jobs) submitted in the grid via the single instance of the Listener class.

In the case where there are not yet in the system, for example, 6 jobs awaiting scheduling, the Listener agent L may return "null"; otherwise, there may be returned to the invoker an object Vector containing, in each location, an array of strings referring to a single job, as follows:

array[0]=a table of the Data Base on which to make the query;

array[1]=a feat_name, i.e., the name of the feature to make the query;

array[2]=a type of worker node: in the simulations all the nodes may be of a SUNSO type;

array[3]=a path Name of the file top.CIR associated to the job. The value may be retrieved dynamically by the listener;

array[4]=an id of the job, non-static parameter, assigned via the use of an incremental variable of a long type; and array[5]=null, it may be up to the agentNash to set the value with its own name.

Whenever a new execution of the agents system for a simulation of the scheduling algorithm is launched, the Listener agent L starts to read, starting preferentially from the end of the file, so as to be certain that information on "old" jobs may not be taken into consideration.

With regard to the prophet agents PHA, it is envisioned that for each job, an agent of this type may be represented, whose behavior is defined by a class ProphetBehavior, with the target of returning to the Nash agent NA the pair (nu*netlistComplexity, lambda).

The computations performed by a prophet agent PHA may include receiving at the input the parameters of the job from the Nash agent, creating an instance of the class Database, and starting two queries via the instance of step 2 and extracting nu and lambda, respectively. Moreover, the computations may include creating an interpreter agent IA and awaiting therefrom the value of the netlistcomplexity (for this purpose, it indicates where the TOP.CIR file is located), and returning to the Nash agent NA the parameter of nu*netlistComplexity (average completion time) and lambda (average interarrival time).

An instance of the interpreter agent IA is created for analyzing the netList TOP.CIR file associated to each job. The behavior of the agent is defined by a class InterpreterBehavior with the target of calculating the netlistComplexity and sending the value to the prophet agent that has made request.

The computations performed by an interpreter agent IA may include identifying all the dependent files starting from the file TOP.CIR, counting the number of nonzero rows of the file, and calculating the netlistComplexity.

Preferably, within the agent there exists an array of the type private final String wordSearch[ ]={".tran", ".pss", ".hb", ".dc", ".ac", ".noise"}, which describes the set of the keywords to be sought for defining the netlistComplexity. Whenever in a file one of the keywords in the set given above is found, the associated weight is taken from the underlying array private final double weightWord[ ]={0.8, 0.5, 0.5, 0.5, 0.8, 0.8}.

In each file that is analyzed, starting from the file TOP.CIR, if the same keyword were to be identified a number of times, for the system this would be equivalent to finding it just once.

The typical modalities of interaction between the agents described (L=Listener; PRA=prisoner agent; PHA=prophet agent; IA=interpreter agent) are described in FIG. 3, where it will be appreciated that the return messages are entered for the sole purpose of facilitating reading of the diagram.

Figure 3:
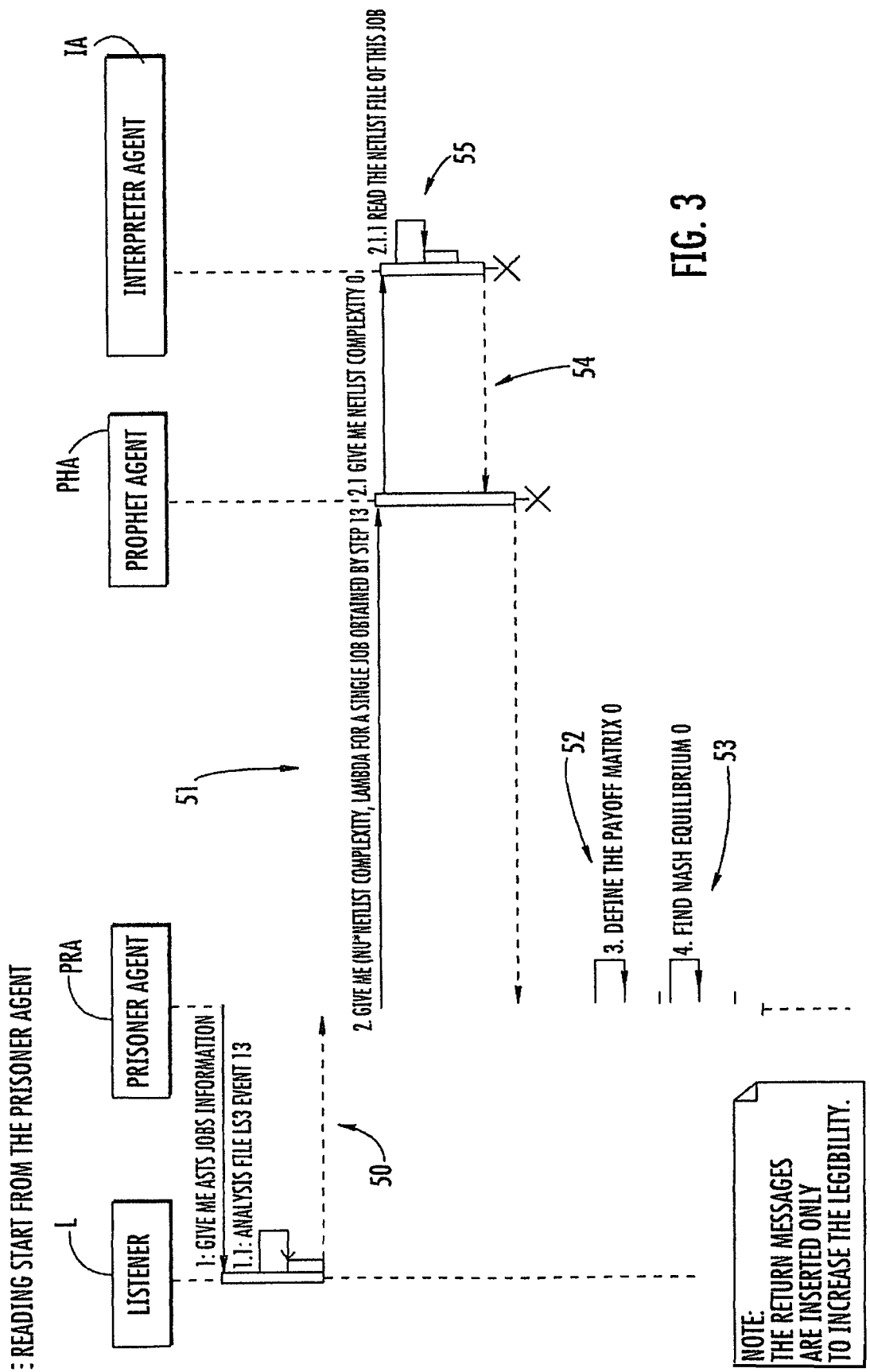
FIG. 3 shows the diagram of the sequence and interaction between the agents, according to the present invention

Reading of FIG. 3 starts from the prisoner agent PRA, who, in 50, asks the listener L for the information on the last, say, 6 jobs submitted to the grid as contained in the respective file of analysis LSB.event( ).

51 expresses then the request, made by the prisoner agent PRA to the prophet agent PHA, of the values nu*netlistComplexity, lambda for the individual job amongst the ones considered. The prophet agent PHA, in 54, passes the request of netlistComplexity on to the interpreter agent IA, while 55 expresses the reading of the file NetList corresponding to the job by the interpreter agent IA queried.

54 and 55 correspond then to the definition, by the prisoner agent PRA, of the payoff matrix and to retrieval, once again by the prisoner agent PRA, of the corresponding Nash equilibrium.

Figure 4:
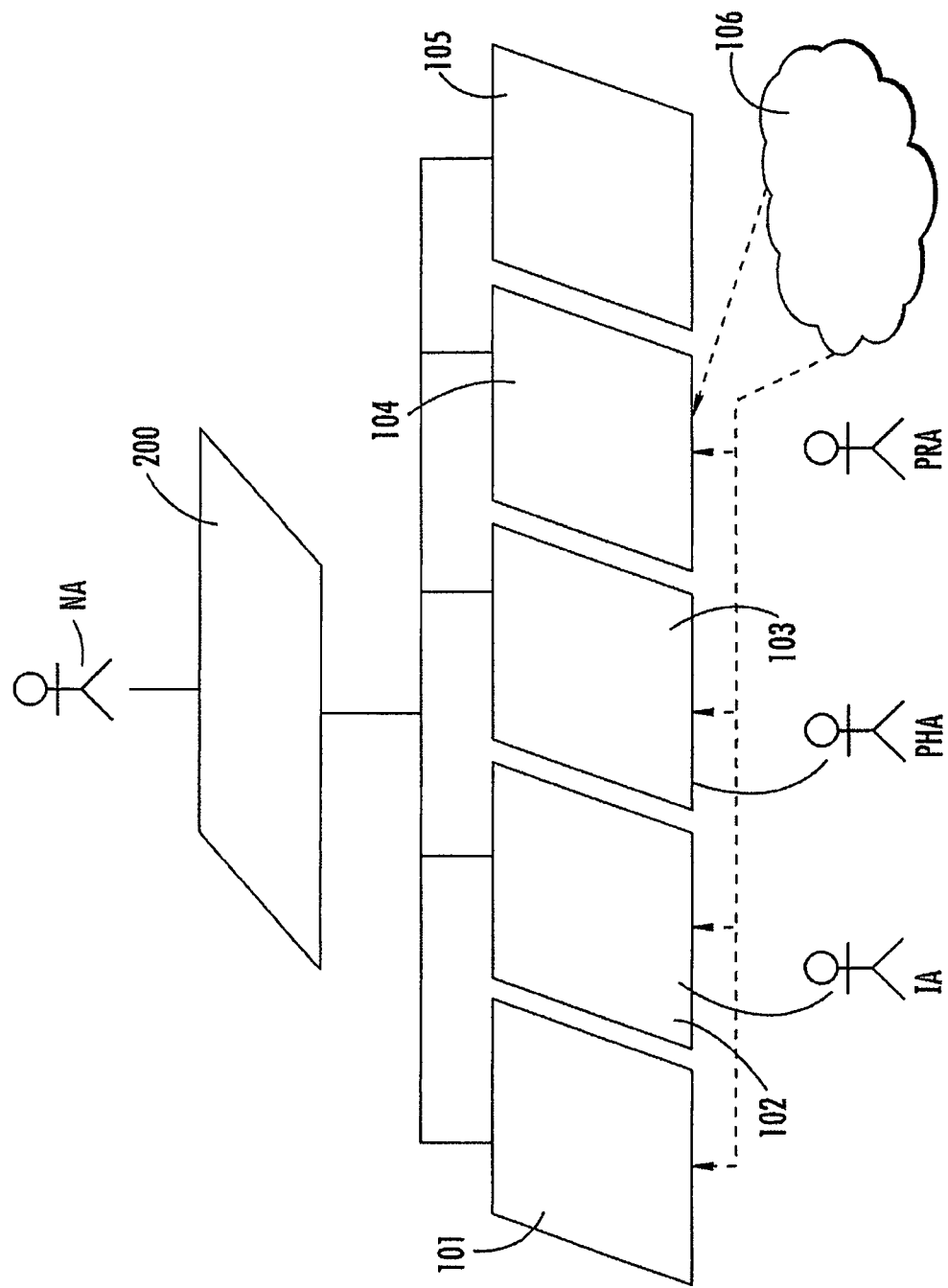
FIG. 4 shows the goal model of the aforesaid agents of the present invention.

Finally, FIG. 4 illustrates the high-level purposes (goals and sub-goals) of the various components i.e., of the agents described above. In particular, at the level of (sub)purposes or subgoals the following functions are envisioned, receiving information on the last 6 jobs submitted (101), calculating the netlist complexity (102), calculating the non-functional attributes (103), creating the payoff matrix (104), with the qualitative purpose of sending in due time to the Nash agent NA the values computed (106), and seeking Nash equilibrium (105).

The foregoing has the final purpose 200 of defining a scheduling algorithm (for example, of an HTC type).

The Nash-equilibrium search by the prisoner agents PRA applied on the matrix of the Prisoner's Dilemma can be exemplified (always assuming, as it is reasonable to do, that the jobs of the grid and the nodes WN can be distributed in homogeneous classes) by the pseudocode reproduced hereinafter. The pseudocode refers to the scheduling of a grid job via optimal allocation of the resources with the choice of a class of homogeneous nodes WN.

---

Begin

```
Calculate NF-attributes values a_{mn} for matrix (4.a);
Calculate payoff values u(x) for matrix (4.b) using
formulas (4.1, 4.2);
Calculate z__max = max(u(x)_{WNij3}) for i = 1, ..., c;
for each matrix M'
    /*fixed payoff component for agent j_1 and j_3 and
    playing with agent j_2 moving on x - axis of matrix
    (4.b) to verify if exists a better strategy for
    him:*/
    for each WN_i ∈ {WN_1, WN_2, ..., WN_c}
        if (u(x)_{WN1j2} > u(x)_{WNij2}) then
            /*fixed payoff component for agent j_2 and j_3 and
            playing with agent j_1 moving on y - axis of
            matrix (4.b) to verify if exists a better
            strategy for him:*/
            if (u(x)_{WN1j1} > u(x)_{WNij1}) then
                /*fixed payoff component for agent j_1 and j_2
                and playing with agent j_3 moving on z - axis of
                matrix (4.b) to verify if exists a better
                strategy for him:*/
                if (u(x)_{WN1j3} >= z__max then
                    s*=[ u(x)_{WN1j1}, u(x)_{WN1j2}, u(x)_{WN1j3}];
                end if
            else
                /* given i' > i
                if (u(x)_{WNij1} > u(x)_{WNi'j1}) then
                    if (u(x)_{WNij3} >= z__max then
                        s*=[ u(x)_{WNij1}, u(x)_{WN1j2}, u(x)_{WNij3}];
                    end if
                end if
            else
                // given i' > i
                if (u(x)_{WNij2} > u(x)_{WNi'j2}) then
                    if (u(x)_{WNij1} > u(x)_{WNi'j1}) then
                        if (u(x)_{WNij3} >= z__max then
                            s*=[ u(x)_{WNij1}, u(x)_{WNij2}, u(x)_{WNij3}];
                        end if
                    end if
                end if
            end if
    end For
end For
return s*
End
```

---

The approach described herein enables the intrinsic limitations represented by the intrinsically heterogeneous and complex infrastructure linked to Grid Computing techniques to be overcome.

Moreover, the approach described herein is suited to the provision of an efficient middleware capable of making distributed applications so as to improve the performance, increase the rate of execution, and automate the user-request procedures. The users do not therefore have to make any hypothesis or estimate of the characteristics of the jobs entrusted to the grid (for example: usages in terms of memory or CPU). The concomitant access to distributed and shared resources of calculation is based upon a "Resource Negotiation" procedure.

This job-allocation mechanism can be based upon an approach of automatic negotiation, overcoming the approach (implemented by the user) of manual booking, the approach leaving to the users of the grid the choice and the estimation of the resources used, with consequent risk of overestimating or underestimating resources and thus waste of grid resources.

Of course, without prejudice to the principle of the approach, the details of implementation and the embodiments may be varied, even significantly, with respect to what is described and illustrated herein, without this implying any departure from the scope of the approach, as defined by the annexed claims.

That which is claimed:

1. A method for scheduling execution of jobs using resources of a computational grid comprising:
    identifying an equilibrium threshold between the resources and the jobs, with the equilibrium threshold being used to identify below which Pareto-optimal strategies are applied and above which Nash-equilibrium strategies are applied;
    if below the equilibrium threshold, then scheduling the execution of the jobs using the resources of the computational grid according to the Pareto-optimal strategies; and
    if above the equilibrium threshold, then scheduling the execution of the jobs using the resources of the computational grid according to the Nash-equilibrium strategies.

2. A method according to claim 1, wherein the equilibrium threshold comprises a temporal threshold in terms of duration of execution of the jobs.

3. A method according to claim 1, wherein the resources of the computational grid include at least one of central processing unit (CPU) resources and memory resources.

4. A method according to claim 1, wherein the Pareto-optimal strategies include an allocation of the jobs to the resources of the computational grid by reaching a condition in which a job condition of one of the resources of the computational grid cannot be improved without worsening a job condition of another of the resources of the computational grid.

5. A method according to claim 1, wherein the Nash-equilibrium strategies include an allocation of the jobs to the resources of the computational grid by reaching a condition in which the resources of the computational grid have no interest in abandoning their own allocation strategy if all other resources of the computational grid have adopted their allocation strategy.

6. A method according to claim 1, wherein the Nash-equilibrium strategies include evaluating a Nash-equilibrium as record of equilibrium strategies including optimal responses of the resources of the computational grid obtained by an intersection of sets of optimal strategies for each resource.

7. A method according to claim 1, further comprising:
    producing a model of the computational grid including agents representing the jobs, and capable of making moves corresponding to a choice of a given resource for carrying out a given job; and
    evaluating a Nash-equilibrium according to a threshold of the payoff of the agents.

8. A method according to claim 7, further comprising identifying a profit as a threshold of a likelihood of optimizing a probability of a completion time of a given job for one of the agents.

9. A method according to claim 8, further comprising evaluating the profit on a basis of a payoff matrix with associated attributes for each job.

10. A method according to claim 9, wherein the attributes comprise at least one of an estimated service time for a given job by a resource of the computational grid, a length of a queue for rendering a service, and an estimated interarrival rate of the jobs.

11. A method according to claim 1, further comprising determining, for each of the resources of the computational grid, a utility function unique to each of the jobs.

12. A method according to claim 11, further comprising determining the unique utility function based upon a plurality of utility components representing weights associated to respective attributes for a given job.

13. A method according claim 11, further comprising:
    classifying the jobs and the resources of the computational grid in homogeneous classes; and
    creating an adaptation between the homogenous classes of the jobs and the classes of the resources of the computational grid by increasing a computational throughput of the computational grid to a threshold.

14. A method according to claim 12, further comprising:
    creating, for the jobs, respective profit agents, for acquiring information based upon a completion time of respective jobs and information based upon an interarrival time of respective jobs;
    creating a main agent for scheduling execution of the jobs using the resources of the computational grid, the main agent receiving from respective prophet agents the information based upon the completion time of the respective jobs and the information based upon the interarrival time the respective jobs; and
    creating a payoff matrix file for a set of the jobs that have arrived last at the computational grid and finding a corresponding Nash equilibrium.

15. A scheduler device for scheduling execution of jobs using resources of a computational grid and comprising:
    a processor configured for identifying an equilibrium threshold between the resources and the jobs, with the equilibrium threshold being used to identify below which Pareto-optimal strategies are applied and above which Nash-equilibrium strategies are applied;
    said processor being further being configured for scheduling the execution of the jobs using the resources of the computational grid according to the Pareto-optimal strategies if below the equilibrium threshold and scheduling the execution of the jobs using the resources of the computational grid according to the Nash-equilibrium strategies if above the equilibrium threshold.

16. A scheduler device according to claim 15, wherein the equilibrium threshold comprises a temporal threshold in terms of duration of execution of the jobs.

17. A scheduler device according to claim 15, wherein the resources of the computational grid include at least one of CPU resources and memory resources.

18. A scheduler device according to claim 15, wherein the Pareto-optimal strategies include an allocation of the jobs to the resources of the computational grid by reaching a condition in which a job condition of one of the resources of the computational grid cannot be improved without worsening a job condition of another of the resources of the computational grid.

19. A scheduler device according to claim 15, wherein the Nash-equilibrium strategies include an allocation of the jobs to the resources of the computational grid by reaching a condition in which the resources of the computational grid have no interest in abandoning their own allocation strategy if all other resources of the computational grid have adopted their allocation strategy.

20. A scheduler device according to claim 15, wherein the Nash-equilibrium strategies include evaluating a Nash-equilibrium as record of equilibrium strategies including optimal responses of the resources of the computational grid obtained by an intersection of sets of optimal strategies for each resource.

21. A computational grid comprising:
a plurality of resources for carrying out jobs; and
a scheduler device comprising a processor configured for identifying an equilibrium threshold between the resources and the jobs, with the equilibrium threshold being used to identify below which Pareto-optimal strategies are applied and above which Nash-equilibrium strategies are applied;
said processor being further being configured for scheduling the execution of the jobs using the resources of the computational grid according to the Pareto-optimal strategies if below the equilibrium threshold and scheduling the execution of the jobs using the resources of the computational grid according to the Nash-equilibrium strategies if above the equilibrium threshold.

22. A computational grid according to claim 21, wherein the equilibrium threshold comprises a temporal threshold in terms of duration of execution of the jobs.

23. A computational grid according to claim 21, wherein the resources of the computational grid include at least one of CPU resources and memory resources.

24. A computational grid according to claim 21, wherein the Pareto-optimal strategies include an allocation of the jobs to the resources of the computational grid by reaching a condition in which a job condition of one of the resources of the computational grid cannot be improved without worsening a job condition of another of the resources of the computational grid.

25. A computational grid according to claim 21, wherein the Nash-equilibrium strategies include an allocation of the jobs to the resources of the computational grid by reaching a condition in which the resources of the computational grid have no interest in abandoning their own allocation strategy if all other resources of the computational grid have adopted their allocation strategy.

26. A computational grid according to claim 21, wherein the Nash-equilibrium strategies include evaluating a Nash-equilibrium as record of equilibrium strategies including optimal responses of the resources of the computational grid obtained by an intersection of sets of optimal strategies for each resource.

27. A non-transitory computer-readable medium for scheduling execution of jobs using resources of a computational grid, the computer-readable medium comprising:
a first computer executable module for identifying an equilibrium threshold between the resources and the jobs, with the equilibrium threshold being used to identify below which Pareto-optimal strategies are applied and above which Nash-equilibrium strategies are applied;
a second computer executable module for scheduling the execution of the jobs using the resources of the computational grid according to the Pareto-optimal strategies if below the equilibrium threshold; and
a third computer executable module for scheduling the execution of the jobs using the resources of the computational grid according to the Nash-equilibrium strategies if above the equilibrium threshold.

28. A non-transitory computer-readable medium according to claim 27, wherein the equilibrium threshold comprises a temporal threshold in terms of duration of execution of the jobs.

29. A non-transitory computer-readable medium according to claim 27, wherein the resources of the computational grid include at least one of CPU resources and memory resources.

30. A non-transitory computer-readable medium according to claim 27, wherein the Pareto-optimal strategies include an allocation of the jobs to the resources of the computational grid by reaching a condition in which a job condition of one of the resources of the computational grid cannot be improved without worsening a job condition of another of the resources of the computational grid.

31. A non-transitory computer-readable medium according to claim 27, wherein the Nash-equilibrium strategies include an allocation of the jobs to the resources of the computational grid by reaching a condition in which the resources of the computational grid have no interest in abandoning their own allocation strategy if all other resources of the computational grid have adopted their allocation strategy.

32. A non-transitory computer-readable medium according to claim 27, wherein the Nash-equilibrium strategies include evaluating a Nash-equilibrium as record of equilibrium strategies including optimal responses of the resources of the computational grid obtained by an intersection of sets of optimal strategies for each resource.

* * * * *

UNITED STATES PATENT AND TRADEMARK OFFICE
CERTIFICATE OF CORRECTION

| | | |
|---|---|---|
| PATENT NO. | : 8,671,409 B2 | Page 1 of 1 |
| APPLICATION NO. | : 12/101740 | |
| DATED | : March 11, 2014 | |
| INVENTOR(S) | : Spata | |

It is certified that error appears in the above-identified patent and that said Letters Patent is hereby corrected as shown below:

In the Claims

Column 14, Line 13    Insert: --to-- after "according"

Delete: "11"
Insert: --1--

Column 14, Line 20    Delete: "12"
Insert: --1--

Column 14, Line 41    Delete: "processor being"
Insert: --processor--

Column 15, Line 14    Delete: "processor being"
Insert: --processor--

Signed and Sealed this
Fourteenth Day of July, 2015

Michelle K. Lee
*Director of the United States Patent and Trademark Office*